United States Patent
Luick et al.

(10) Patent No.: US 9,555,503 B2
(45) Date of Patent: Jan. 31, 2017

(54) MACHINE COMPONENT CLADDING STRATEGY

(71) Applicant: Caterpillar, Inc., Peoria, IL (US)

(72) Inventors: Kegan Luick, Corinth, MS (US); Daniel Sordelet, Peoria, IL (US); Daniel T. Cavanaugh, Chillicothe, IL (US); Justin Embrey, Morton, IL (US)

(73) Assignee: Caterpillar Inc., Peoria, IL (US)

( * ) Notice: Subject to any disclaimer, the term of this patent is extended or adjusted under 35 U.S.C. 154(b) by 591 days.

(21) Appl. No.: 14/022,957

(22) Filed: Sep. 10, 2013

(65) Prior Publication Data

US 2015/0069025 A1    Mar. 12, 2015

(51) Int. Cl.
| | |
|---|---|
| B23K 26/34 | (2014.01) |
| B23K 26/067 | (2006.01) |
| B23K 26/08 | (2014.01) |
| F16C 3/10 | (2006.01) |
| B23K 26/00 | (2014.01) |
| B23K 26/36 | (2014.01) |

(52) U.S. Cl.
CPC ......... *B23K 26/345* (2013.01); *B23K 26/0006* (2013.01); *B23K 26/0066* (2013.01); *B23K 26/0676* (2013.01); *B23K 26/083* (2013.01); *B23K 26/0823* (2013.01); *B23K 26/0869* (2013.01); *B23K 26/342* (2015.10); *B23K 26/362* (2013.01); *B23K 26/60* (2015.10); *F16C 3/10* (2013.01); *B23K 2203/50* (2015.10)

(58) Field of Classification Search
CPC .............. B23K 26/006; B23K 26/0066; B23K 26/0676; B23K 26/0823; B23K 26/083; B23K 26/0869; B23K 26/342; B23K 26/345; B23K 26/362; B23K 26/60
See application file for complete search history.

(56) References Cited

U.S. PATENT DOCUMENTS

| | | | |
|---|---|---|---|
| 4,898,650 A | * | 2/1990 | Wu .......................... C25D 5/34 134/1 |
| 6,329,630 B1 | * | 12/2001 | Sato ...................... B08B 7/0042 134/1 |
| 8,378,248 B2 | | 2/2013 | Simpson et al. |

(Continued)

FOREIGN PATENT DOCUMENTS

| | | |
|---|---|---|
| CN | 1072625 | 6/1993 |
| CN | 101204757 | 6/2008 |

(Continued)

OTHER PUBLICATIONS

Derwent Abstract of CN 102383126, Jan. 2016.*

*Primary Examiner* — Geoffrey S Evans

(57) ABSTRACT

Cladding and remanufacturing a machine component includes directing cleaning and welding beams split from an incident laser beam toward the machine component, and moving the machine component relative the cleaning and welding beams such that the welding beam trails behind the cleaning beam along a common travel path. A surface of the machine component is decontaminated by the cleaning beam, while a cladding material is melted via the welding beam such that upon solidifying the cladding material forms a coating metallurgically bonded to base material and previously deposited cladding material of the machine component.

12 Claims, 4 Drawing Sheets

(56) References Cited

U.S. PATENT DOCUMENTS

| | | | | |
|---|---|---|---|---|
| 2007/0160476 A1* | 7/2007 | Cheng | ................... | B23P 6/007 |
| | | | | 416/193 A |
| 2008/0029498 A1 | 2/2008 | Forrest et al. | | |
| 2008/0296272 A1 | 12/2008 | Lei et al. | | |
| 2011/0062128 A1 | 3/2011 | De Kock et al. | | |
| 2012/0100313 A1* | 4/2012 | Colby | ............... | B23K 26/0823 |
| | | | | 427/591 |

FOREIGN PATENT DOCUMENTS

| | | | |
|---|---|---|---|
| CN | 10238312 | | 3/2012 |
| CN | 102383126 | | 3/2012 |
| CN | 102828180 | | 12/2012 |
| DE | 19516589 A1 | * | 11/1996 |
| EP | 0544567 | | 6/1993 |
| JP | 60121093 A | * | 6/1985 |
| JP | 62253777 | | 11/1987 |
| JP | 1-122684 A | * | 5/1989 |
| JP | 2-111863 A | * | 4/1990 |
| JP | 8-112683 A | * | 5/1996 |
| JP | 11-245066 A | * | 9/1999 |
| JP | 2003320472 | | 11/2003 |
| JP | 2009095851 | | 5/2009 |
| KR | 1232008 | | 2/2013 |
| WO | WO-2014/025244 A1 | * | 2/2014 |

\* cited by examiner

MACHINE COMPONENT CLADDING STRATEGY

TECHNICAL FIELD

The present disclosure relates generally to the field of machine component cladding, and more particularly to dividing an incident laser beam into cleaning and welding beams for decontamination and cladding of a machine component surface.

BACKGROUND

Lasers have innumerable different applications in modern industry. Lasers are used to directly melt materials and to preheat parts, as well as in a great many different diagnostic and process control applications. Among other things, in the field of welding lasers offer the advantages of precise control over the spatial and temporal delivery of heat energy. One specialized type of laser welding is known as laser cladding, where a laser beam is used to melt a feedstock material in contact with or prior to contacting a part to be clad. In some instances the feedstock material is supplied in the form of a sprayed or pre-placed powder or the like, and in others in the form of a wire.

Cladding of certain parts has long been recognized as a strategy for improving the performance and/or service life of all or certain areas of a part, and laser cladding techniques can provide for great process efficiency in many instances. Certain machine components are well known to benefit from the application of a relatively hard or otherwise fatigue or damage resistant cladding upon a softer base material of the component. Laser apparatus tends to be relatively expensive, however, and the application of laser cladding techniques appears far from reaching its full theoretical potential. Ample room for improvement upon known techniques as to laser configuration and operation, as well as expansion of laser cladding technology to new applications thus exists. A laser clad track bushing and process is set forth in U.S. Pat. No. 5,994,664 to Anderton et al.

SUMMARY

In one aspect, a method of cladding a machine component includes splitting an incident laser beam into a cleaning beam and a welding beam, and directing the cleaning and welding beams toward a machine component such that the cleaning and welding beams impinge upon a surface of the machine component. The method further includes moving the machine component relative the cleaning and welding beams such that the welding beam trails behind the cleaning beam along a common travel path upon the surface. The method further includes decontaminating the surface along the common travel path via the cleaning beam, and melting a cladding material via the welding beam such that the melted cladding material contacts the decontaminated surface along the common travel path and upon solidifying bonds to material of the machine component forming the surface.

In another aspect, a method of remanufacturing a machine component includes receiving a machine component after service in a machine system and having been machined to remove material of the machine component having a defect therein. The method further includes directing a cleaning beam and a welding beam each split from an incident laser beam toward a surface of the machine component formed at least in part via the machining, such that the cleaning and welding beams impinge upon the surface. The method further includes moving the machine component relative the cleaning and welding beams such that the welding beam trails behind the cleaning beam along a common travel path upon the surface. The method still further includes decontaminating the surface along the common travel path via the cleaning beam, and melting a cladding material via the welding beam such that the melted cladding material contacts the decontaminated surface along the common travel path and upon solidifying forms a coating bonded to the machine component in place of the removed material.

DETAILED DESCRIPTION

Figure 1:
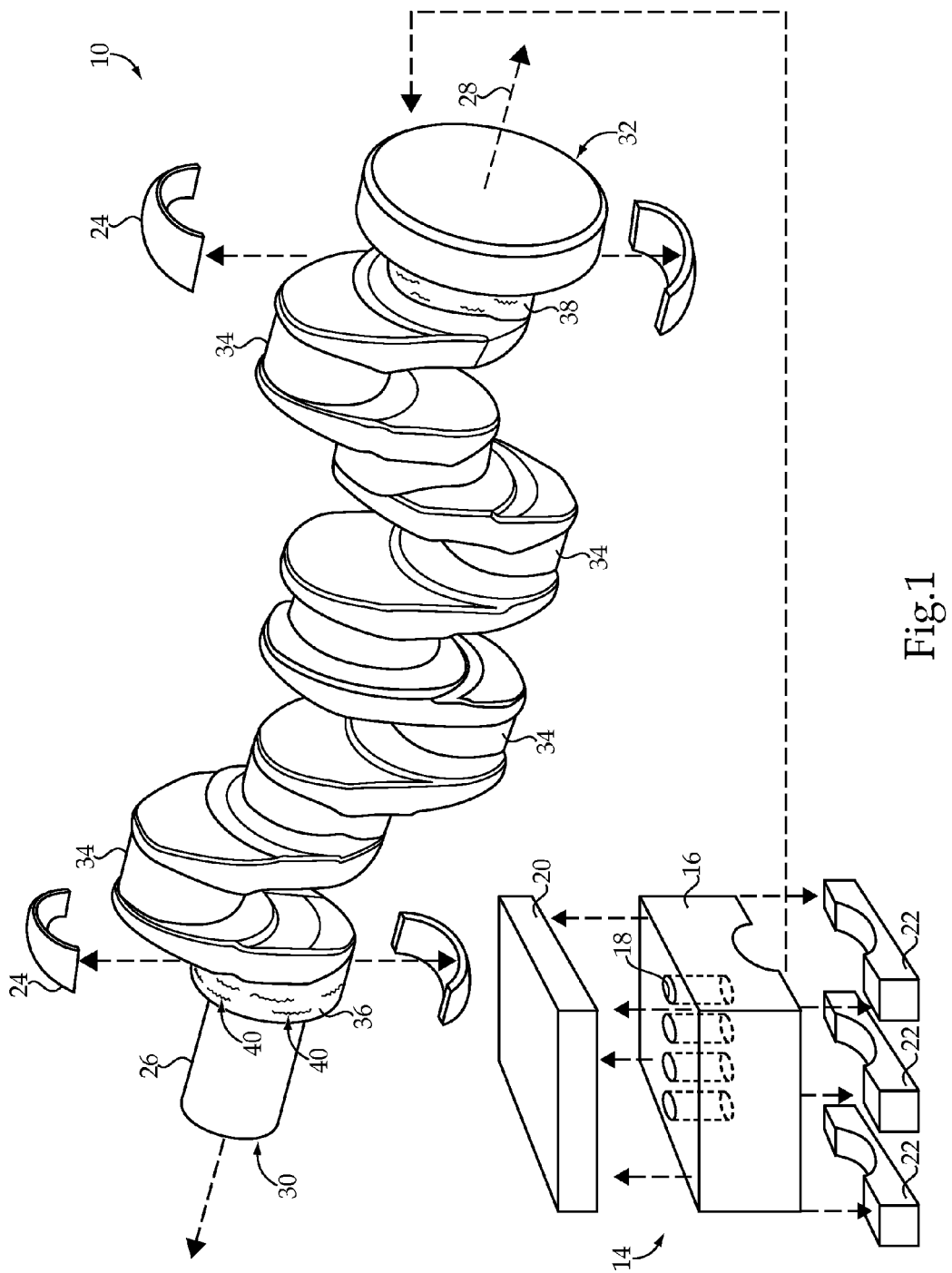
FIG. 1 is a diagrammatic view of a disassembled machine system having a machine component suitable for cladding, according to one embodiment.

Referring to FIG. 1, there is shown a machine system 10 as it might appear disassembled for inspection and prior to commencing remanufacturing. Machine system 10 may be an engine system, such as a compression ignition internal combustion engine system, including a machine component 12 removed from an engine housing 14. In one practical implementation strategy, machine component 12 includes an engine shaft such as a crankshaft having an elongate shaft body 26, and housing 14 includes various components such as a cylinder block 16 having a plurality of cylinders 18, a cylinder head 20, and crank bearing caps or supports 22. Those skilled in the art will appreciate of course that various other components of engine system 14 are omitted from the FIG. 1 illustration. Component 12 might instead be a camshaft, or any of a variety of other typically high performance and/or fatigue-sensitive components used in machine systems such as various gears. As will be further apparent from the following description, machine component 12 may be received after service in system 10, and remanufactured according to the present disclosure to return component 12 to a state as good as or better than new.

Due to relatively harsh operating conditions experienced by various machine components in service, it is common upon disassembling machine systems for remanufacturing for there to be various forms of wear and/or damage to the machine components of interest. Elongate and rotatable machine components such as crankshafts and camshafts, for example, are commonly rotatably journaled within a housing via bearings. In the case of component 12, a first and a second split bearing each shown via reference numeral 24 are used for such purposes in a conventional manner. Those skilled in the art will readily understand that component 12 when positioned between cylinder block 12 and supports 22 will rotate within bearings 24 to convert linear piston motion into rotational motion within system 10 in a well-known manner. Different operating conditions and factors such as torsional loading, thrust loading, tolerance stack-ups or manufacturing imperfections, contaminants in lubricating oil and the like, can result in development of defects in component 12 during service. A typical service life for a crankshaft or camshaft in an internal combustion engine may be many thousands of hours. Where contaminants are introduced in lubricating oil supplied to bearings 24, where cooling failures occur, or any of a variety of other deviations from theoretically optimal conditions occur, surfaces on component 12 can be damaged. It is thus well known that upon removing an engine shaft from an engine scratches, scuffs, pitting, corrosion or other defects such as warping may be apparent. Component 12 includes such defects in the example form of wear marks 40, and in a manner further discussed herein the present disclosure contemplates unique strategies for repairing such defects and returning component 12 to service without encountering disadvantages of known repair and remanufacturing techniques.

Shaft body 26 may be elongate as noted above, and defines a longitudinal axis 28 extending between a first axial end 30 and a second axial end 32. Positioned axially inward of first axial end 30 is a bearing surface 36, which is substantially cylindrical and extends circumferentially around axis 28, configured to contact one of bearings 24 in service. Axially inward of second axial end 32 is another bearing surface 28 similarly configured and associated with a corresponding one of bearings 24. A third bearing surface (not numbered) is positioned near the middle of shaft body 26. Shown on each of bearing surfaces 36 and 38 are defects 40. The field of remanufacturing generally seeks to return remanufactured components to a condition as good as or better than new. It is common for remanufacturing engineers and technicians to rely upon prints and other specifications for new parts in determining whether remanufactured parts are ready to be returned to service. Surface finishes are commonly specified. Accordingly, the presence of defects 40, which may be visible to the unaided eye, violates specifications for a new crankshaft. In conventional strategies material of component 12 in which defects 40 are formed would typically be removed by machining, reducing the diameter of surfaces 36 and 38 and necessitating the use of a so-called undersized bearing when component 12 is returned to service. Localized tempering of regions where material was removed might also be needed, a requirement dispensed with in the present disclosure. At least respecting certain engine shafts the state of the art has thus been to modify damaged shafts from specifications, and compensate for the modification by installing them within an engine using different sized bearings than were previously used. Chrome plating has also been used to restore bearing surfaces on engine shafts. In the case of engine shaft lobes such as camshaft lobes, prior practice often includes scrapping the associated engine shaft where visible lobe damage is present.

The present disclosure contemplates machining away material wherein defects 40 are formed, and instead of departing from specifications restoring crankshaft 12 to original specifications via the addition of a coating in a manner further discussed herein. Bearing surfaces 36 and 38, and other such bearing surfaces as may reside on crankshaft 12, will typically be repaired in this general manner. Component 12 also includes crankpins 34 positioned axially between ends 30 and 32. In certain embodiments, crankpins 34 might be repaired in the manner described herein. In the case of a camshaft it is also contemplated that bearing surface repair will be carried out, but other parts of the camshaft such as the cam lobes might also be repaired within the present context. For that matter, surfaces other than cylindrical surfaces and upon components other than engine shafts might also be repaired according to the present techniques as noted above.

Figure 2:
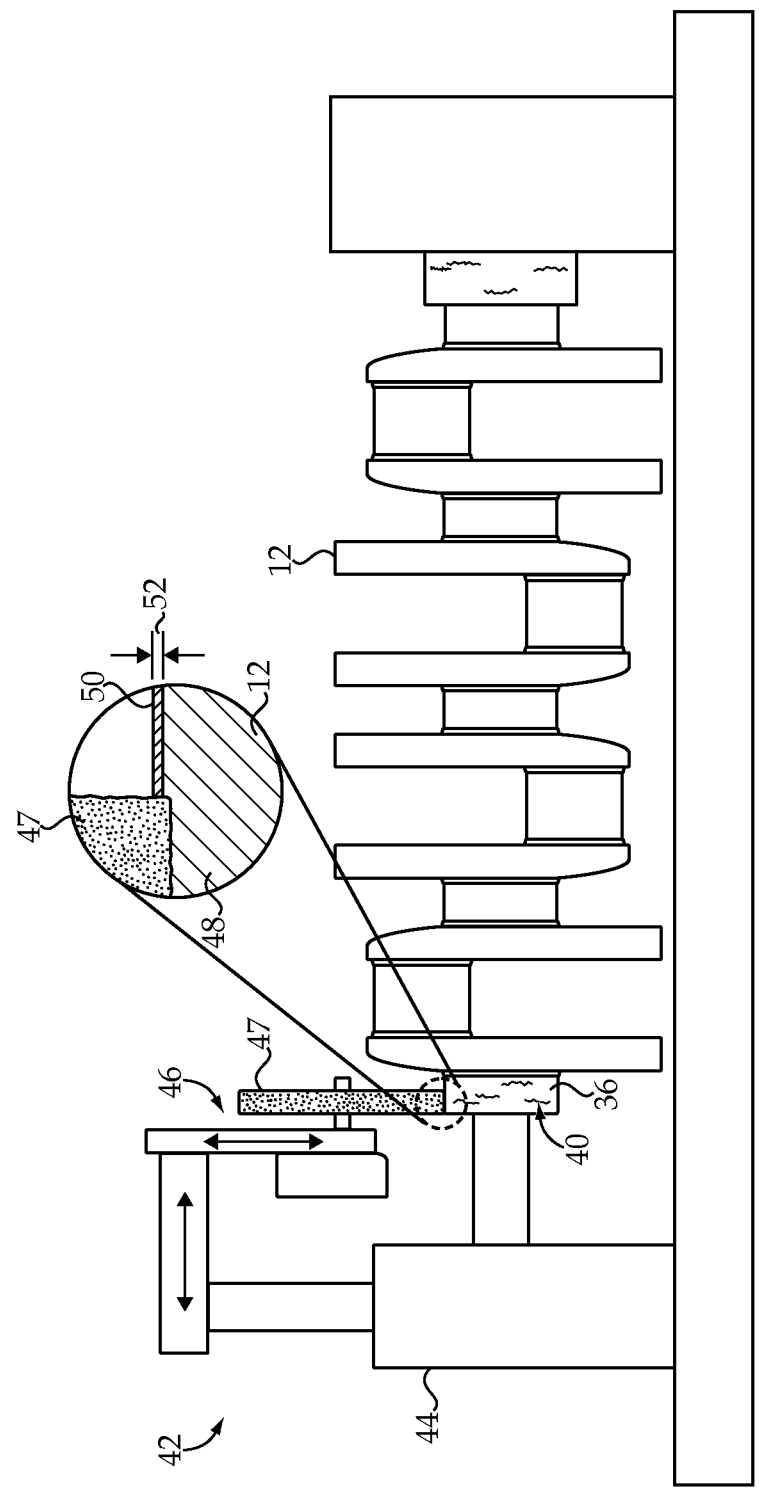
FIG. 2 is a diagrammatic view of the machine component of FIG. 1, including a detailed enlargement, at a processing stage, according to one embodiment.

Referring now also to FIG. 2, there is shown component 12 mounted upon a fixture 44 at or in a machining system 42. Component 12 is shown as it might appear where a grinder 46 having a grinding wheel 47 is positioned in contact with surface 36 and where one or both of grinding wheel 47 and component 12 are rotated. Grinding of surface 36 will machine material of component 12 having defects 40 therein to remove the material. In a practical implementation strategy surface 36 might be machined to a uniform depth along its axial length, to uniformly remove a generally cylindrical volume of material of component 12. It is common for parts of certain machine components 12, including crankshafts and camshafts, to be hardened to improve fatigue resistance. FIG. 2 includes a detailed enlargement showing grinding wheel 47 engaged against component 12 upon surface 36 and grinding away base material 48 of component 12. The base material ground away may include hardened base material 50, such as might be obtained via localized heat treatment of base material 48, and having a hardening depth 52 from about 0.5 millimeters to about 2.0 millimeters in many instances.

Figure 3:
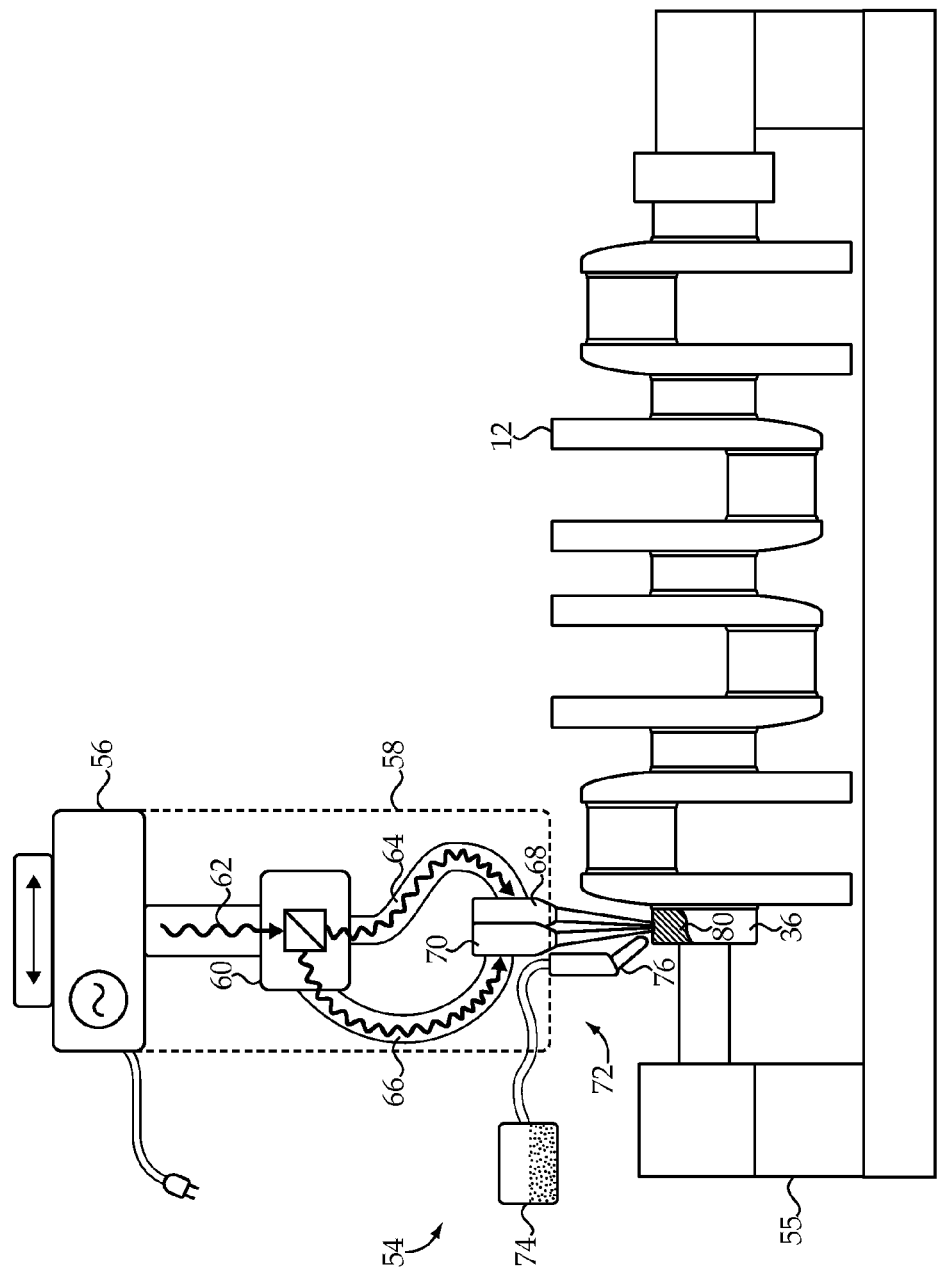
FIG. 3 is a diagrammatic view of the machine component at yet another processing stage.

Referring now to FIG. 3, there is shown machine component 12 having been forwarded for subsequent processing after grinding. Component 12 is shown positioned within another fixture 55 and held therein for treatment via a laser welding apparatus 54. Apparatus 54 may include a power supply 56, and a dual head 58 that includes a first nozzle 68 and a second nozzle 70. Apparatus 54 further includes a beam splitter 60 that splits an incident laser beam 62 into a cleaning beam 64 and a welding beam 66. Apparatus 54 also includes a material supply mechanism 72 including a nozzle 76 that may discharge a feedstock material supplied from a reservoir or supply 74 for forming a coating on component 12 as further discussed herein. Mechanism 72 may supply a powdered metal material or the like, but could instead supply material in the form of a wire for instance. One suitable steel cladding material for cladding a forged, carbon steel machine component is a mixture or uniform composition of hard facing tool steel materials, such as 4140, 4340, and potentially others, although the present disclosure is not thereby limited. The composition of a suitable cladding material will typically be similar to the composition of the base material to be clad. In FIG. 3, component 12 is shown where apparatus 54 has been used to form a coating 80 of cladding material upon surface 36, and is in the process of cladding/coating an entirety of surface 36 according to certain process parameters.

INDUSTRIAL APPLICABILITY

Figure 4:
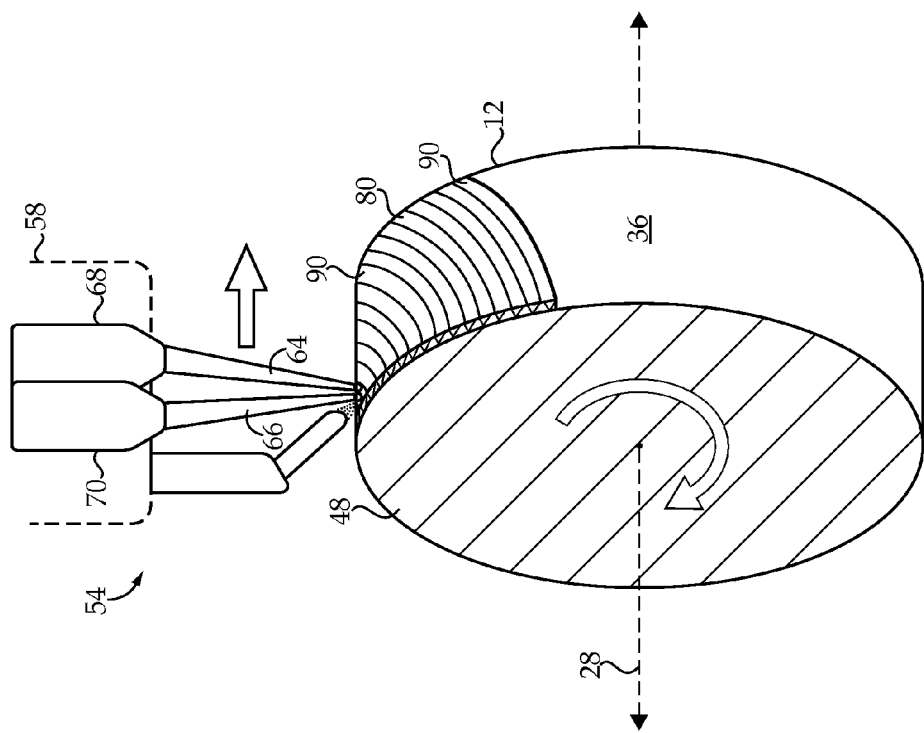
FIG. 4 is an enlarged diagrammatic view of a portion of the machine component at the processing stage of FIG. 3.

Referring also now to FIG. 4, there is shown a close-up view of a portion of component 12 that includes surface 36. At the state depicted in FIG. 4, incident laser beam 62 has been split into cleaning beam 64 and welding beam 66, and nozzles 68 and 70 direct each of cleaning and welding beams 64 and 66 toward component 12 such that cleaning and welding beam 64 and 66 impinge upon surface 36. Beams 64 and 66 may be oriented normal, or modestly angled, to surface 36, say at angles of incidence of about 10° or less from vertical. Machine component 12 may be moved relative cleaning and welding beams 64 and 66 such that welding beam 66 trails behind cleaning beam 64 along a common travel path upon surface 36. A relative travel speed might be about 20 millimeters per second, or less, and a beam step size may be about 2.5 millimeters. In the illustrated embodiment, apparatus 54 might be moved in a generally linear fashion, to the right in FIG. 4, while component 12 is rotated. As a result, component 12 may be understood as circumferentially advancing relative cleaning and welding beams 64 and 66. Cladding material may be supplied via mechanism 72 such that the cladding material is melted via welding beam 66. Meanwhile, surface 36 may be decontaminated along the common travel path of beams 64 and 66 via beam 64. As a consequence, melted cladding material contacts the decontaminated surface along the common travel path and upon solidifying forms coating 80, whereby the cladding material and thus coating 80 are metallurgically bonded to base material and previously deposited cladding material of component 12 forming surface 36.

As noted above, surface 36 may be substantially cylindrical, and defines center axis 28. Moving machine component 12 relative beams 64 and 66 may further include axially advancing component 12 relative beams 64 and 66 while the circumferential advancement of component 12 relative beams 64 and 66 is occurring. The melted cladding material upon solidifying may thus form a newly deposited bead 92 of cladding material that is helical in form, or otherwise curved. The common travel path traversed via beams 64 and 66 may also be helical or otherwise curved. In a practical implementation strategy, apparatus 54 may be used to melt cladding material and decontaminate a surface in advance of deposition of the melted cladding material a plurality of times so as to circumferentially coat an entirety of surface 36 with a plurality of overlapping helical beads. In FIG. 4, component 12 is shown as it might appear where surface 36 is partially coated with coating 80, consisting of previously deposited beads 90 and as yet partially formed, newly deposited bead 92. In other embodiments, linear beads might be formed on a bearing surface as opposed to helical or otherwise curved beads. In still other instances, rather than a curved surface, cladding might be applied to a flat surface within the present context to result in a more or less planar coating, at least once machined. In all instances, coatings might include a single layer, two or three layers, or potentially still more layers of cladding material.

Figure 5:
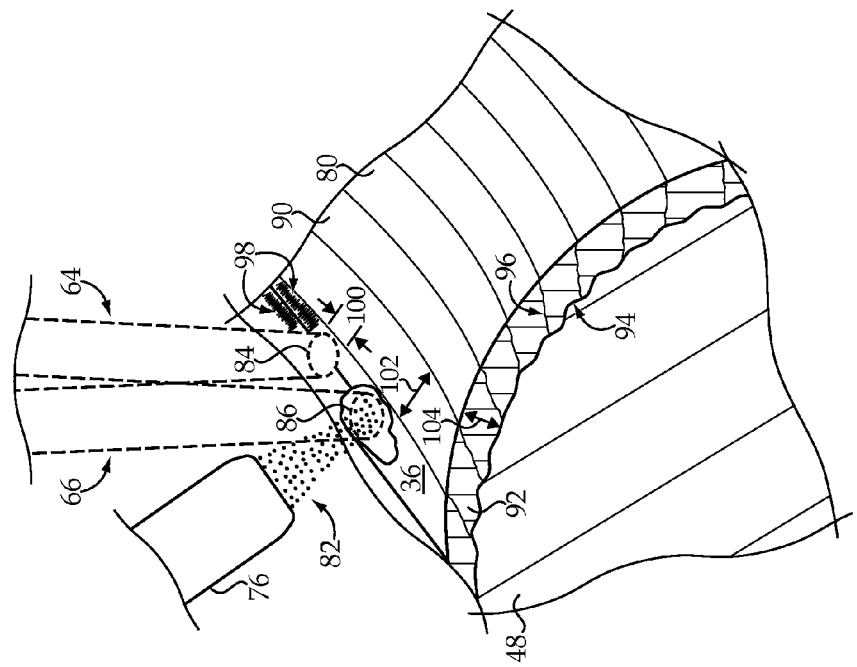
FIG. 5 is a close-up view of the machine component at the processing stage of FIG. 3.

Referring also now to FIG. 5, there is shown a close-up view similar to the processing stage depicted in FIG. 4. Nozzle 76 delivers material 82 and material 82 is melted via energy of beam 66. Along the common travel path and in advance of beam 66, beam 64 impinges upon surface 36. Whereas energy delivered via beam 66 may be sufficient to melt material forming surface 36, energy delivery via beam 64 may be less than what is required to heat material of component 12 forming surface 36 to melting. Material having been impinged upon by cleaning beam 64 may be preheated of course when subsequently impinged upon by beam 66. It may also be noted from FIG. 5 that newly deposited bead 92 partially overlaps a previously deposited and adjacent bead 90. Cladding material 82 and base material 48 of component 12, as well as previously deposited but solidified cladding material forming the adjacent bead 90, may melt and together mix in a melt pool 88. It should be appreciated therefore that beam 66 may impinge upon a part of previously deposited bead 90 and also a part of surface 36 not yet clad and formed of base material 48. Once newly deposited bead 92 is complete, apparatus 54 and/or component 12 may be adjusted to reposition apparatus 54 and commence formation of another bead until coating 80 extends completely circumferentially around component 12.

Also shown in FIG. 5 are contaminants 98 in or upon base material 48 of component 12, and also contaminants in or upon cladding material 82 forming previously deposited bead 90. Those skilled in the art will be familiar with the conditions during many welding procedures which are conducive to the formation of oxide contaminants upon surfaces of material exposed to an oxidative environment. In many instances, an inert shielding gas is used to prevent oxidation of freshly deposited and/or otherwise melted welding materials. Even where the materials themselves are not recently heated or melted, oxidation will tend to occur over time where oxygen is present in the environment. Welding of most types is thus sensitive to oxide contamination, which can confound the integrity of the welding process, and in the case of coatings result in voids and other imperfections that can create or propagate cracks and/or lead to coating delamination. Accordingly, contaminants 98 may form upon recently deposited material 82, and may have been already formed upon base material 48 forming surface 36. Other contaminants can include welding slag, for instance. It has been discovered that cleaning beam 64 may be used to impinge upon a surface to be clad just prior to depositing molten materials upon the surface, such that the surface is decontaminated and virtually zero oxide contamination has time to occur. Decontaminating surface 36 may thus include volatilizing contaminants from base material 48 and cladding material 82 of previously deposited bead 90.

Moving component 12 may include moving component 12 at a speed relative cleaning and welding beams 64 and 66 and at a spacing of beams 64 and 66 such that melted cladding material 82 contacts surface 36 in a molten state prior to oxide recontamination of base material 48 and the previously deposited cladding material. The result is a robust metallurgical bond between cladding material 82 and base material 48, and coating 80 may be nonporous. Although some porosity can be considered to exist in virtually any material at least at atomic scales, in the present context nonporous may be understood to mean no pores, or only a very few, pores of about 0.010 millimeters (10 microns) or greater can be expected to be present. In other instances, pores about 0.250 millimeters or smaller or from about 0.100 millimeters to about 0.150 millimeters or smaller, might be permissible. Although such a coating would not likely be considered nonporous as that term is intended to be understood, preventing pores or voids greater than about 0.150 millimeters can be expected to produce a coating having acceptable resistance to cracking and/or delamination. Some melting of base material 48 will tend to occur via energy of beam 66, whether the energy is delivered directly via impingement upon the base material or indirectly via impingement of molten cladding material 82. As a result, a bond line 94 between each bead 90, 92 and base material 48 may have the form of some mixed base material and cladding material. Bond lines 96 formed between adjacent and overlapping beads 90, 92 may consist of cladding material only. Bond lines 94 and 96 may be nonporous, although the present disclosure is not thereby limited.

In a practical implementation strategy, component 12 may be moved relative beams 64 and 66 such that a beam spot 84 of beam 64 and another beam spot 86 of beam 66 synchronously advance along the common travel path, in the FIG. 5 illustration the travel path being generally in a mildly steepening curve up to the right and into the page. In other instances, one or both of nozzles 70 and 68 might be adjustable so that movement of beam spots 84 and 86 is not strictly synchronous. Moreover, one or both of beams 64 and 66 might be moved in a back and forth weaving pattern while axially and/or circumferentially progressing along the common travel path. Cleaning beam 64 and welding beam 66 might each be pulsed such that the impingement upon component 12 is discontinuous. Beam spots 84 and 86 may be circular beam spots in many embodiments, but could also be rectangular. Apparatus 54 may be configured and operated such that welding beam 66 has a power about 5000 Watts and cleaning beam a power of about 400 Watts, thus cleaning beam 64 could have less than 10% of the laser power available from incident beam 62, although a different division of the laser power might be used. Beam spot 84 may also be smaller than beam spot 86, in some instances providing a greater intensity of energy delivery per unit area per unit time than that of beam 66, but having an on-time short enough that melting of material forming component 12 does not occur.

In FIG. 5, a beam spot diameter 100 is shown and may be from about 1 millimeter to about 7 millimeters. Also shown in FIG. 5 is a coating thickness dimension 104 which may be from about 0.25 millimeters to about 2.0 millimeters. Multiple coating layers might be used in certain embodiment as noted above. A bead width dimension 102 may be at least several times thickness dimension 104, and may be from about 2 millimeters to about 40 millimeters, although the present disclosure is not thereby limited. Beams 64 and 66 might be oscillated using suitable known actuators for nozzles 68 and 70 to enable impinging upon areas larger than their respective spot areas. As used herein the term "about" is to be understood in the context of conventional rounding to a consistent number of significant digits. Thus, "about 20" means from 15 to 24, and so on. As alluded to above, in certain instances shielding gas might not be used at all. Welding flux might not be used either, although the use of welding flux and even the use of shielding gas could still fall within the scope of the present disclosure. It will also be recalled that an original hardening depth of base material 48 may be from about 0.5 mm to about 2.0 mm, and for purposes of remanufacturing component 12 may be machined to remove material down to approximately that original hardening depth, or potentially deeper. To restore component 12 and in particular surface 36 to original specifications, depending upon whether one or more layers of cladding material are applied, and how thick those layers of cladding material are, coating 80 may be machined to dimensions and a surface finish specified for a new component such as a new crankshaft or camshaft. In this general manner, application of coating 80 is applied in place of material removed via machining, and can be understood as restoring a surface reduced in diameter via the machining from an original specification back to that original specification.

The present description notes applications to remanufacturing machine components received after service in a machine system, although those skilled in the art will appreciate that the teachings set forth herein might also be applied to new parts. In the case of new parts, it may be possible to avoid heat treating new parts since application of a relatively hard cladding material can enable localized hardening of the part at fatigue sensitive locations. It may also be possible to produce parts at lower costs, since it may be unnecessary to make the entire part out of expensive alloys and instead areas which are fatigue or wear-sensitive or otherwise have high performance expectations can be spot treated according to the techniques set forth herein.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims.

What is claimed is:

1. A method of cladding a machine component comprising the
steps of:
splitting an incident laser beam into a cleaning beam and a welding beam;
directing the cleaning and welding beams toward a machine component such that the cleaning and welding beams impinge upon a surface of the machine component;
moving the machine component relative the cleaning and welding beams such that the welding beam trails behind the cleaning beam along a common travel path upon the surface;
decontaminating the surface along the common travel path via the cleaning beam; and
melting a cladding material via the welding beam such that the melted cladding material contacts the decontaminated surface along the common travel path and upon solidifying bonds to material of the machine component forming the surface, wherein the surface is substantially cylindrical and defines a center axis, and the step of moving includes axially advancing the machine component relative the cleaning and welding beams, wherein the material forming the surface includes a base material of the machine component and cladding material in the form of a previously deposited bead, such that the melted cladding material upon solidifying forms a newly deposited bead overlapping the previously deposited bead, and wherein the step of moving further includes circumferentially advancing the machine component relative the cleaning and welding beams such that the newly deposited bead is helical.

2. The method of claim 1 further comprising repeating the decontaminating and melting steps a plurality of times so as to circumferentially coat the entire surface with a plurality of overlapping helical beads.

3. The method of claim 1 wherein:
the step of decontaminating includes volatilizing contaminants from the base material and the cladding material of the previously deposited bead; and
the step of melting further includes melting the cladding material such that the melted cladding material contacts the decontaminated surface in a molten state prior to recontamination of the surface.

4. The method of claim 3 further comprising a step of pulsing the cleaning beam such that the impingement of the cleaning beam is discontinuous.

5. The method of claim 1 wherein the step of melting further includes melting the cladding material such that the melted cladding material upon solidifying metallurgically bonds to a base material of the machine component and previously deposited cladding material together forming the surface.

6. The method of claim 5 wherein the step of moving further includes moving the machine component such that beam spots of the cleaning and welding beams synchronously advance along the common travel path.

7. The method of claim 6 wherein the common travel path is helical.

8. A method of remanufacturing a machine component comprising the steps of:
- receiving a machine component after service in a machine system and having been machined to remove material of the machine component having a defect therein;
- directing a cleaning beam and a welding beam each split from an incident laser beam toward a surface of the machine component formed at least in part via the machining, such that the cleaning and welding beams impinge upon the surface;
- moving the machine component relative the cleaning and welding beams such that the welding beam trails behind the cleaning beam along a common travel path upon the surface;
- decontaminating the surface along the common travel path via the cleaning beam; and
- melting a cladding material via the welding beam such that the melted cladding material contacts the decontaminated surface along the common travel path and upon solidifying forms a coating bonded to the machine component in place of the removed material, wherein the surface of the machine component includes a cylindrical surface reduced in diameter from a specification via the machining, and further comprising a step of restoring the diameter to the specification via the coating and wherein the step of melting further includes melting the cladding material such that the melted cladding material upon solidifying forms the coating in the form of a helical bead overlapping a previously deposited helical bead of cladding material.

9. The method of claim 8 wherein the machine component includes an engine shaft and the cylindrical surface includes a bearing surface of the engine shaft.

10. The method of claim 8 wherein the step of melting further includes melting the cladding material in contact with the decontaminated surface such that upon solidifying the coating is metallurgically bonded to base material of the machine component and to the previously deposited cladding material.

11. The method of claim 10 wherein the step of decontaminating further includes volatilizing contaminants from the base material and the previously deposited cladding material such that the coating is nonporous.

12. The method of claim 11 wherein the step of moving includes synchronously moving the machine component at a speed relative the cleaning and welding beams and at a spacing of the cleaning and welding beams such that melted cladding material contacts the surface prior to oxide recontamination of the base material and the previously deposited cladding material.

* * * * *